US011955634B2

United States Patent
Yu et al.

(10) Patent No.: US 11,955,634 B2
(45) Date of Patent: Apr. 9, 2024

(54) PARTICLE STRUCTURE OF CATHODE MATERIAL AND PREPARATION METHOD THEREOF

(71) Applicant: Advanced Lithium Electrochemistry Co., Ltd., Taoyuan (TW)

(72) Inventors: Ching-Hao Yu, Taoyuan (TW); Nae-Lih Wu, Taoyuan (TW); Chia-Hsin Lin, Taoyuan (TW)

(73) Assignee: ADVANCED LITHIUM ELECTROCHEMISTRY CO., LTD., Taoyuan (TW)

( * ) Notice: Subject to any disclaimer, the term of this patent is extended or adjusted under 35 U.S.C. 154(b) by 115 days.

(21) Appl. No.: 17/529,772

(22) Filed: Nov. 18, 2021

(65) Prior Publication Data
US 2022/0255073 A1    Aug. 11, 2022

(30) Foreign Application Priority Data
Feb. 8, 2021    (TW) ................................. 110104766

(51) Int. Cl.
*H01M 4/52* (2010.01)
*H01M 4/13* (2010.01)
(Continued)

(52) U.S. Cl.
CPC .......... *H01M 4/525* (2013.01); *H01M 4/131* (2013.01); *H01M 4/366* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| 10,756,339 B2 * | 8/2020 | Choi .................... H01M 4/525 |
| 2014/0205898 A1 | 7/2014 | Lee et al. |

(Continued)

FOREIGN PATENT DOCUMENTS

| CN | 101154726 A | 4/2008 |
| CN | 103081184 A | 5/2013 |

(Continued)

*Primary Examiner* — Maria Laios
*Assistant Examiner* — Angela J Martin
(74) *Attorney, Agent, or Firm* — KIRTON McCONKIE; Evan R. Witt

(57) ABSTRACT

A particle structure of cathode material and a preparation method thereof is provided. Firstly, a precursor for forming a core is provided. The precursor includes at least nickel, cobalt and manganese. Secondly, a metal salt and a lithium ion compound are provided. The metal salt includes at least potassium, aluminum and sulfur. After that, the metal salt, the lithium ion compound and the precursor are mixed, and a mixture is formed. Finally, the mixture is subjected to a heat treatment step, and a cathode material particle structure is formed to include the core, a first coating layer coated on the core and a second coating layer coated on the first coating layer. The core includes potassium, aluminum and a Li-M-O based material. The first coating layer includes potassium and aluminum, and a potassium content of the first coating layer is higher than a potassium content of the core. The second coating layer includes sulfur.

18 Claims, 20 Drawing Sheets

(51) Int. Cl.
    *H01M 4/131*      (2010.01)
    *H01M 4/36*      (2006.01)
    *H01M 4/525*      (2010.01)
    *H01M 10/05*      (2010.01)
    *H01M 10/0525*      (2010.01)
    *H01M 4/02*      (2006.01)

(56) References Cited

U.S. PATENT DOCUMENTS

| | | | |
|---|---|---|---|
| 2015/0243970 A1 | 8/2015 | Choi et al. | |
| 2015/0364756 A1* | 12/2015 | Kim | C01G 53/54 427/126.3 |
| 2018/0013129 A1 | 1/2018 | Lee et al. | |
| 2018/0241073 A1* | 8/2018 | You | H01M 4/525 |
| 2020/0411858 A1 | 12/2020 | Toma et al. | |

FOREIGN PATENT DOCUMENTS

| | | |
|---|---|---|
| CN | 103515606 B | 9/2016 |
| CN | 107925065 A | 4/2018 |
| CN | 108269981 A | 7/2018 |
| CN | 108390039 A | 8/2018 |
| CN | 108400322 A | 8/2018 |
| JP | 2001006672 A | 1/2001 |
| JP | 2011526732 A | 10/2011 |
| JP | 2016033902 A | 3/2016 |
| JP | 2020119784 A | 8/2020 |
| WO | 2011054440 A1 | 5/2011 |
| WO | 2017119457 A1 | 7/2017 |

\* cited by examiner

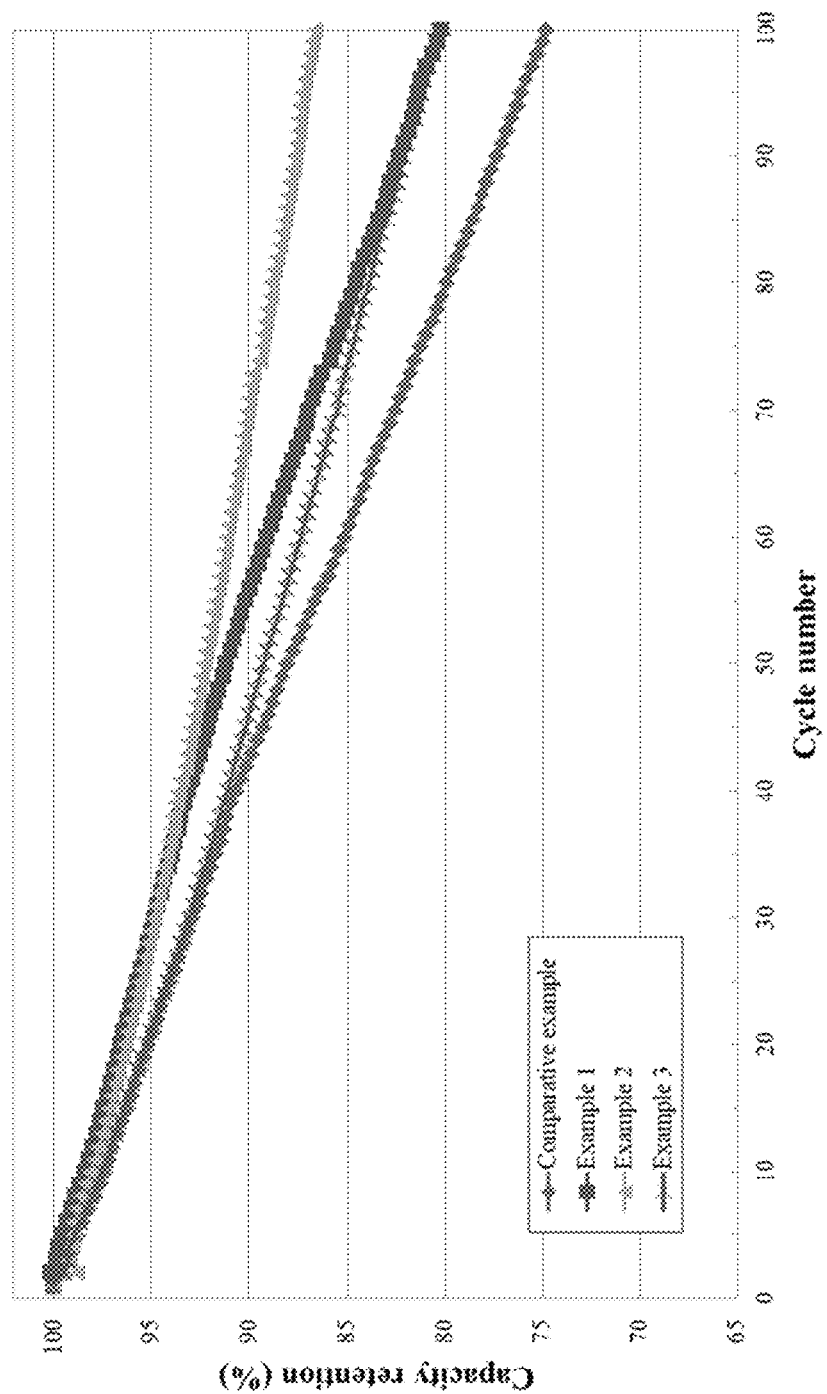

PARTICLE STRUCTURE OF CATHODE MATERIAL AND PREPARATION METHOD THEREOF

FIELD OF THE INVENTION

The present disclosure relates to a cathode material for a secondary battery, and more particularly to a particle structure of cathode material and a preparation method thereof for improving a working voltage and a cycle life of a battery formed thereby.

BACKGROUND OF THE INVENTION

In recent years, with the advancement of technology and the rise of environmental awareness, the demand for reusable secondary batteries has increased gradually. Secondary batteries are used in common devices, such as smart phones, laptops, digital cameras, electric cars, etc. However, these devices are required to have certain level of performance to comply with the trend of miniaturization and increasingly complex functional requirements.

Among different types of secondary batteries, lithium ion battery is a popular and potential choice with its high energy density, high working voltage and long cycle life. However, the surface of the cathode material of the lithium ion battery easily reacts with the electrolyte during charging and discharging. The reaction between the cathode material and the electrolyte results in a decrease in battery characteristics such as the working voltage and the cycle life, and the battery performance is adversely affected.

Therefore, there is a need to provide a cathode material for a secondary battery, and more particularly to a particle structure of cathode material and a preparation method thereof for improving a working voltage and a cycle life of a battery formed thereby.

SUMMARY OF THE INVENTION

An object of the present disclosure is to provide a particle structure of cathode material and a preparation method thereof for improving a working voltage and a cycle life of a battery formed thereby. The particle structure of cathode material includes at least two coating layers, and each of the different coating layers has different element composition. Preferably but not exclusively, the at least two coating layers are a first coating layer as an inner coating layer and a second coating layer as an outer coating layer. Since the first coating layer contains potassium and aluminum, it is conducive to the migration of lithium ions. Moreover, the second coating layer contains sulfur, so that the reaction between the cathode material and the electrolyte during charging and discharging is avoided. Accordingly, the purpose of improving the battery performances, such as the cycle life, the capacity and the stability, is achieved.

Another object of the present disclosure is to provide a particle structure of cathode material and a preparation method thereof for improving a working voltage and a cycle life of a battery formed thereby. Preferably but not exclusively, a metal salt and a lithium ion compound are mixed and added to a precursor, and a mixture is formed. The metal salt includes potassium, aluminum and sulfur. The precursor includes nickel, cobalt and manganese. After that, the mixture is subjected to a heat treatment, and the particle structure of cathode material is formed. The particle structure of cathode material has at least two coating layers. Thicknesses and compositions of the at least two coating layers are obtained through analysis results of an X-ray photoelectron spectroscopy (XPS) and a time-of-flight secondary ion mass spectrometer (TOF-SIMS). With at least two coating layers having different compositions, such as potassium, aluminum and sulfur, respectively, the migration of lithium ions is improved, and the reaction between the cathode material and the electrolyte during charging and discharging is avoided.

Another object of the present disclosure is to provide a particle structure of cathode material and a preparation method thereof for improving a working voltage and a cycle life of a battery formed thereby. Preferably but not exclusively, a potassium alum in a specific ratio range is added into a precursor, and a mixture is formed. The mixture is subjected to two heat treatment steps, and the particle structure of cathode material is formed to have at least two coating layers. The particle structure of cathode material has low cation disorder degree and orderly layered structure. Moreover, the preparation method of the particle structure of cathode material is simple and low costing. It is helpful of enhancing the product competitiveness of the battery formed by the particle structure of cathode material.

In accordance with an aspect of the present disclosure, a particle structure of cathode material is provided. The particle structure of cathode material includes a core, a first coating layer and a second coating layer. The first coating layer is coated on the core, and the second coating layer is coated on the first coating layer. The core includes potassium and aluminum. The first coating layer includes potassium and aluminum, and a potassium content of the first coating layer is higher than a potassium content of the core. The second coating layer includes sulfur. With the potassium and the aluminum contained in the core and the first coating layer, the migration of lithium ions is improved. Moreover, with the sulfur contained in the second coating layer, the reaction between the particle structure of cathode material and the electrolyte is avoided. Accordingly, the cycle life and the stability of the battery formed by the particle structure of cathode material are improved.

In an embodiment, the core includes a Li-M-O based material. M is one selected from the group consisting of nickel, cobalt, manganese, magnesium, titanium, aluminum, tin, chromium, vanadium, molybdenum and a combination thereof.

In an embodiment, the Li-M-O based material is a lithium nickel manganese cobalt oxide.

In an embodiment, the particle structure of cathode material has a particle size ranged from 3 μm to 10 μm.

In an embodiment, the particle structure of cathode material has a potassium content ranged from 0.01 mol % to 0.2 mol % and an aluminum content ranged from 0.01 mol % to 0.2 mol %.

In an embodiment, the first coating layer has a first thickness, and the second coating layer has a second thickness. The first thickness is greater than the second thickness.

In an embodiment, the first thickness is ranged from 12 nm to 70 nm. The second thickness is ranged from 1 nm to 3 nm. The first thickness and the second thickness are obtained through analysis results of an X-ray photoelectron spectroscopy and a time-of-flight secondary ion mass spectrometer.

In accordance with another aspect of the present disclosure, a preparation method of a particle structure of cathode material is provided. The preparation method includes steps of: (a) providing a precursor configured to form a core, wherein the precursor includes at least nickel, cobalt and manganese; (b) providing a metal salt and a lithium ion compound, wherein the metal salt includes at least potassium, aluminum and sulfur; (c) mixing the metal salt, the lithium ion compound and the precursor to form a mixture; and (d) subjecting the mixture to a heat treatment step to form the particle structure of cathode material, wherein the particle structure of cathode material includes the core, a first coating layer and a second coating layer, wherein the core includes potassium and aluminum, wherein the first coating layer is coated on the core, and the second coating layer is coated on the first coating, wherein the first coating layer includes potassium and aluminum, and a potassium content of the first coating layer is higher than a potassium content of the core, wherein the second coating layer includes sulfur.

In an embodiment, the core includes a Li-M-O based material. M is one selected from the group consisting of nickel, cobalt, manganese, magnesium, titanium, aluminum, tin, chromium, vanadium, molybdenum and a combination thereof.

In an embodiment, the Li-M-O based material is a lithium nickel manganese cobalt oxide.

In an embodiment, the particle structure of cathode material has a particle size ranged from 3 μm to 10 μm.

In an embodiment, the particle structure of cathode material has a potassium content ranged from 0.01 mol % to 0.2 mol % and an aluminum content ranged from 0.01 mol % to 0.2 mol %.

In an embodiment, the first coating layer has a first thickness, and the second coating layer has a second thickness. The first thickness is greater than the second thickness.

In an embodiment, the first thickness is ranged from 12 nm to 70 nm. The second thickness is ranged from 1 nm to 3 nm. The first thickness and the second thickness are obtained through analysis results of an X-ray photoelectron spectroscopy and a time-of-flight secondary ion mass spectrometer.

In an embodiment, the precursor is formed by a co-precipitation of a first solution and a second solution. The first solution includes at least nickel, cobalt and manganese. The second solution includes at least oxalic acid.

In an embodiment, the step (b) further includes a step: (b1) dissolving the metal salt and the lithium ion compound in a water to form a third solution.

In an embodiment, the metal salt has a weight percentage relative to the precursor, and the weight percentage is ranged from 0.1 wt % to 2 wt %.

In an embodiment, the heat treatment step includes a temperature-holding step. The temperature-holding step has a temperature greater than or equal to 700° C.

In an embodiment, the heat treatment step further includes a first heat treatment step and a second heat treatment step. A maximum temperature of the second heat treatment step is greater than a maximum temperature of the first heat treatment step.

In an embodiment, the metal salt is a potassium alum.

BRIEF DESCRIPTION OF THE DRAWINGS

FIGS. 9A and 9B are charge-discharge characteristic diagrams of the comparative example, the example 1, the example 2 and the example 3 under another charge and discharge rate, voltage range and temperature condition.

DETAILED DESCRIPTION OF THE PREFERRED EMBODIMENT

The present disclosure will now be described more specifically with reference to the following embodiments. It is to be noted that the following descriptions of preferred embodiments of the disclosure are presented herein for purpose of illustration and description only. It is not intended to be exhaustive or to be limited to the precise form disclosed.

Figure 1:
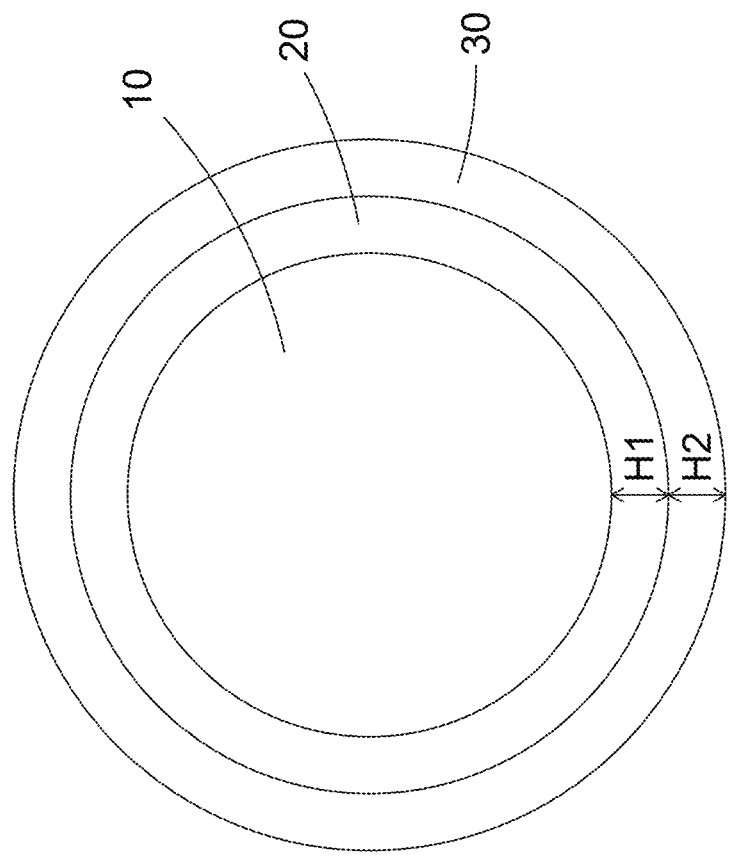
FIG. 1 is a schematic view illustrating a particle structure of cathode material according to an embodiment of the present disclosure.

Refer to FIG. 1. FIG. 1 is a schematic view illustrating a particle structure of cathode material according to an embodiment of the present disclosure. The particle structure of cathode material 1 includes a core 10, a first coating layer 20 and a second coating layer 30. The first coating layer 20 is coated on the core 10, and the second coating layer 30 is coated on the first coating layer 20. The core 10 includes potassium and aluminum. The first coating layer 20 includes potassium and aluminum, and a potassium content of the first coating layer 20 is higher than a potassium content of the core 10. The second coating layer 30 includes sulfur. Notably, with the potassium and the aluminum contained in the core 10 and the first coating layer 20, the migration of lithium ions is improved. On the other hand, with the sulfur contained in the second coating layer 30, the reaction between the particle structure of cathode material 1 and the electrolyte during charging and discharging is avoided. Thus, the cycle life and the stability of the battery formed by the particle structure of cathode material 1 are improved.

Figure 2A:
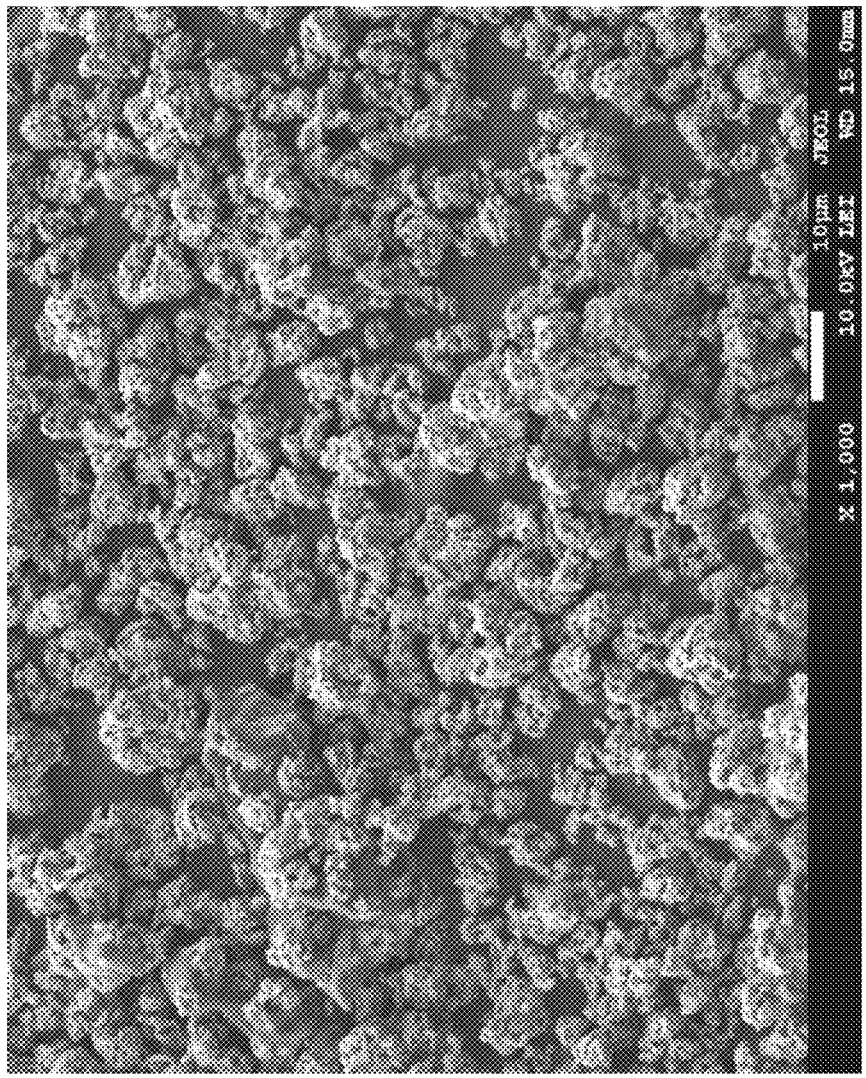
FIGS. 2A to 2C are SEM images of the particle structure of cathode material according to an embodiment of the present disclosure.
Figure 2B:
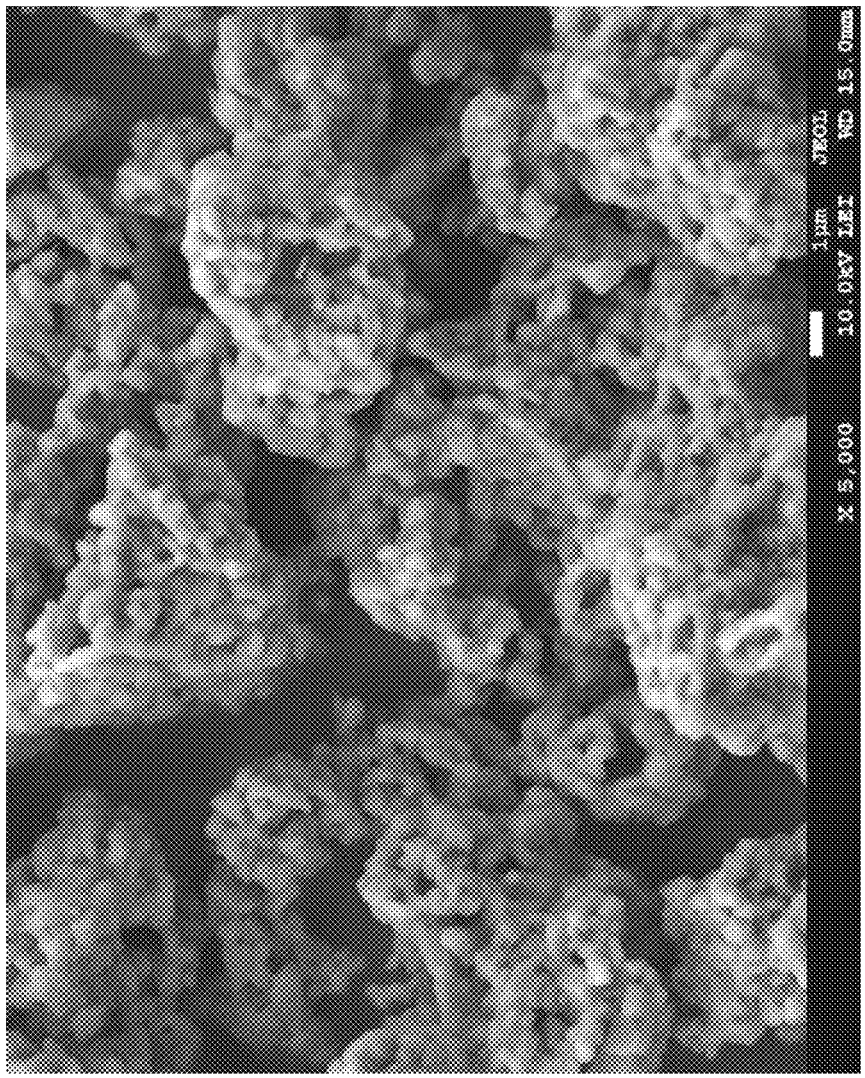
Figure 2C:
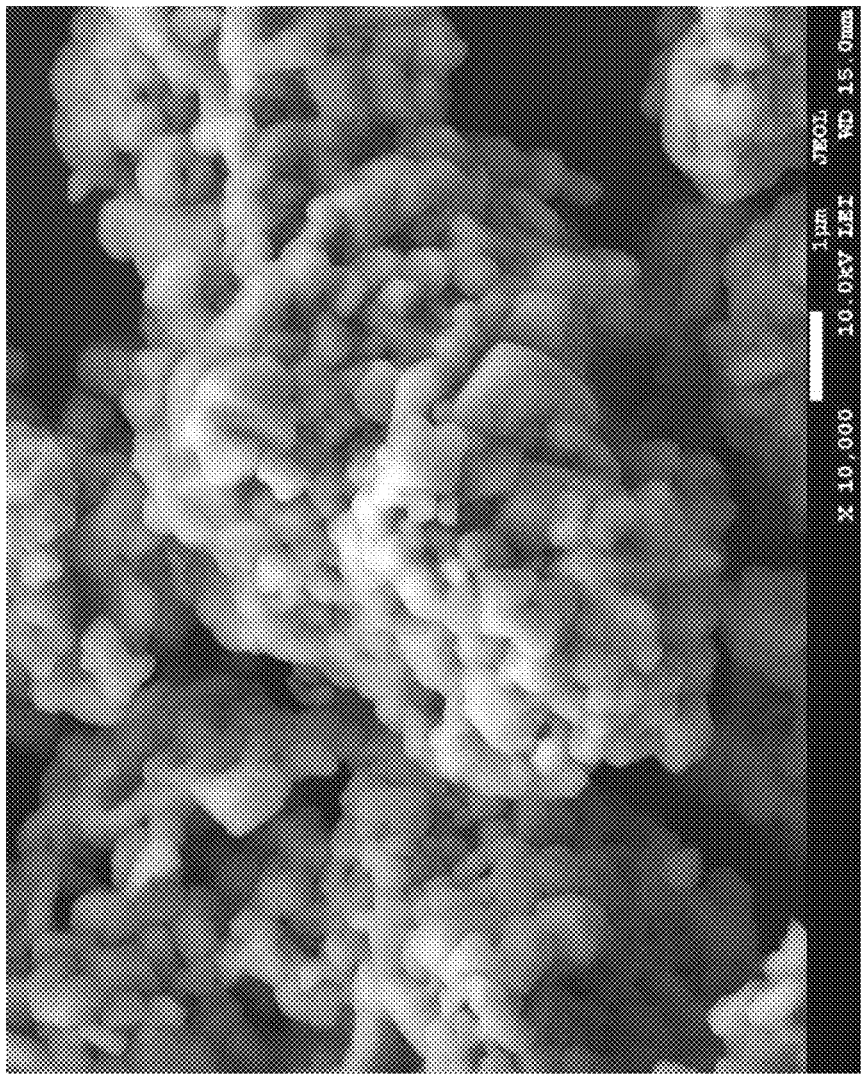

Refer to FIGS. 2A to 2C. FIGS. 2A to 2C are SEM images of the particle structure of cathode material according to an embodiment of the present disclosure. In the embodiment, the core 10 includes a Li-M-O based material. M is one selected from the group consisting of nickel, cobalt, manganese, magnesium, titanium, aluminum, tin, chromium, vanadium, molybdenum and a combination thereof. Preferably but not exclusively, the Li-M-O based material is a lithium nickel manganese cobalt oxide, and the chemical formula of the lithium nickel manganese cobalt oxide is $LiNi_xCo_yMn_zO_2$ (x+y+z=1, 0<x<1, 0<y<1, 0<z<1). Preferably but not exclusively, the Li-M-O based material is a lithium nickel manganese cobalt oxide with higher nickel content. For example, a lithium nickel manganese cobalt oxide with higher nickel content has an 8:1:1 molar ratio among nickel, cobalt and manganese, and the chemical formula of the lithium nickel manganese cobalt oxide is $LiNi_{0.8}Co_{0.1}Mn_{0.1}O_2$. Scanning the particle structure of cathode material 1 through a scanning electron microscopy (SEM), and the images are produced as shown in FIGS. 2A to 2C. From the images, it can be seen that the particle structure of cathode material 1 has a particle size ranged from 3 μm to 10 μm. In the embodiment, the particle structure of cathode material 1 has a potassium content ranged from 0.01 mol % to 0.2 mol % and an aluminum content ranged from 0.01 mol % to 0.2 mol %.

In the embodiment, the first coating layer 20 has a first thickness H1, and the second coating layer 30 has a second thickness H2. The first thickness H1 is greater than the second thickness H2. The first thickness H1 is ranged from 12 nm to 70 nm. The second thickness H2 is ranged from 1 nm to 3 nm. Preferably but not exclusively, the first thickness H1 and the second thickness H2 are obtained through a surface analysis of an X-ray photoelectron spectroscopy (XPS) and a depth profiling analysis of a time-of-flight secondary ion mass spectrometer (TOF-SIMS). It is noted that any instrument that can perform surface analysis and depth profiling analysis, such as an Auger electron spectroscopy (AES), is suitable for obtaining the thicknesses, and the present disclosure is not limited thereto.

Figure 3:
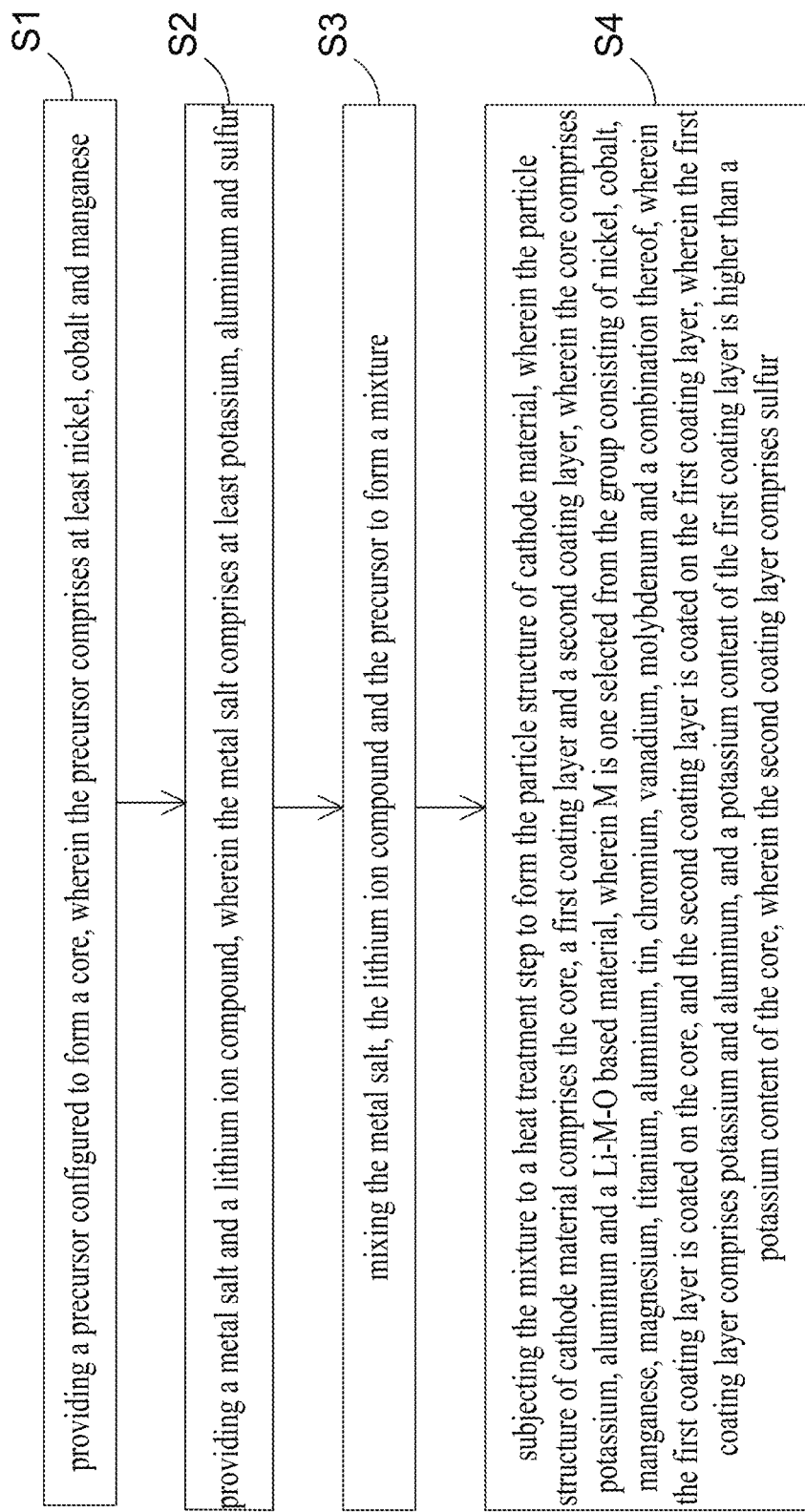
FIG. 3 is a flow chart of a preparation method of the particle structure of cathode material according to an embodiment of the present disclosure.

Refer to FIG. 3. FIG. 3 is a flow chart of a preparation method of the particle structure of cathode material according to an embodiment of the present disclosure. In accordance with the particle structure of cathode material 1 of the present disclosure, a preparation method of the particle structure of cathode material 1 is provided. Firstly, a precursor for forming a core 10 is provided, as shown in step S1. Preferably but not exclusively, the precursor includes at least nickel, cobalt and manganese for preparing a lithium nickel manganese cobalt oxide material. In the embodiment, the precursor is formed by a co-precipitation of a first solution and a second solution. The first solution includes at least nickel, cobalt and manganese. Preferably but not exclusively, the first solution is mixed by a nickel sulfate ($NiSO_4$) solution, a cobalt sulfate ($CoSO_4$) solution, and a manganese sulfate ($MnSO_4$) solution. The second solution includes at least oxalic acid ($H_2C_2O_4$). Preferably but not exclusively, the second solution is mixed by an oxalic acid solution, a sodium hydroxide solution and ammonia solution.

Secondly, a metal salt and a lithium ion compound are provided, as shown in step S2. In the embodiment, the metal salt includes at least potassium, aluminum and sulfur. Preferably but not exclusively, the metal salt is a potassium alum ($KAl(SO_4)_2 \cdot 12H_2O$), and the lithium ion compound is a lithium hydroxide monohydrate ($LiOH \cdot H_2O$).

After that, the metal salt, the lithium ion compound and the precursor are mixed, and a mixture is formed. In the embodiment, a third solution is formed by dissolving the metal salt and the lithium ion compound in a water before being mixed with the precursor, so as to improve the uniformity of the mixture. In the embodiment, the metal salt has a weight percentage relative to the precursor, and the weight percentage is ranged from 0.1 wt % to 2 wt %.

Finally, the mixture is subjected to a heat treatment step, such as calcination, and the particle structure of cathode material 1 is formed. In the embodiment, the heat treatment step further includes a temperature-holding step and a cooling step. The temperature-holding step has a temperature greater than or equal to 700° C. Preferably but not exclusively, holding the temperature at 700° C. facilitates the formation of an orderly layered structure of the particle structure of cathode material 1. The cooling step facilitates the reduction of the oxygen vacancies in the particle structure of cathode material 1. Thus, the battery performance is improved. In the embodiment, the heat treatment step further includes a first heat treatment step and a second heat treatment step. A maximum temperature of the second heat treatment step is greater than a maximum temperature of the first heat treatment step. Preferably but not exclusively, the maximum temperature of the first heat treatment step is 700° C., and the maximum temperature of the second heat treatment step is 775° C. With two-step high-temperature calcination, cation disorder degree of the particle structure of cathode material 1 is further reduced, and a better orderly layered structure is formed. Thus, the battery performance is further improved.

The following examples illustrate the preparation method and efficacy of the present disclosure.

Example 1

A first solution and a second solution are mixed for co-precipitation, and a precursor is formed. The first solution is a solution including metal ions, which is mixed by a 0.24 M nickel sulfate hexahydrate ($NiSO_4 \cdot 6H_2O$) solution, a 0.03 M cobalt sulfate heptahydrate ($CoSO_4 \cdot 7H_2O$) solution and a 0.03 M hydrated manganese sulfate ($MnSO_4 \cdot H_2O$) solution. The second solution is a solution including oxalic acid, which is mixed by a 0.33 M oxalic acid ($H_2C_2O_4$) solution, a 0.3 M sodium hydroxide (NaOH) solution and a 0.075 M ammonia ($NH_4OH$) solution. Preferably but not exclusively, the precursor is

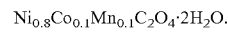

$Ni_{0.8}Co_{0.1}Mn_{0.1}C_2O_4 \cdot 2H_2O$.

A metal salt and a lithium ion compound are dissolved in a water, and a third solution is formed. The metal salt includes at least potassium, aluminum and sulfur, Preferably but not exclusively, the metal salt is a potassium alum ($KAl(SO_4)_2 \cdot 12H_2O$). The lithium ion compound is a lithium hydroxide monohydrate ($LiOH \cdot H_2O$). The weight percentage of the potassium alum relative to the precursor is 0.3 wt %.

Figure 4A:
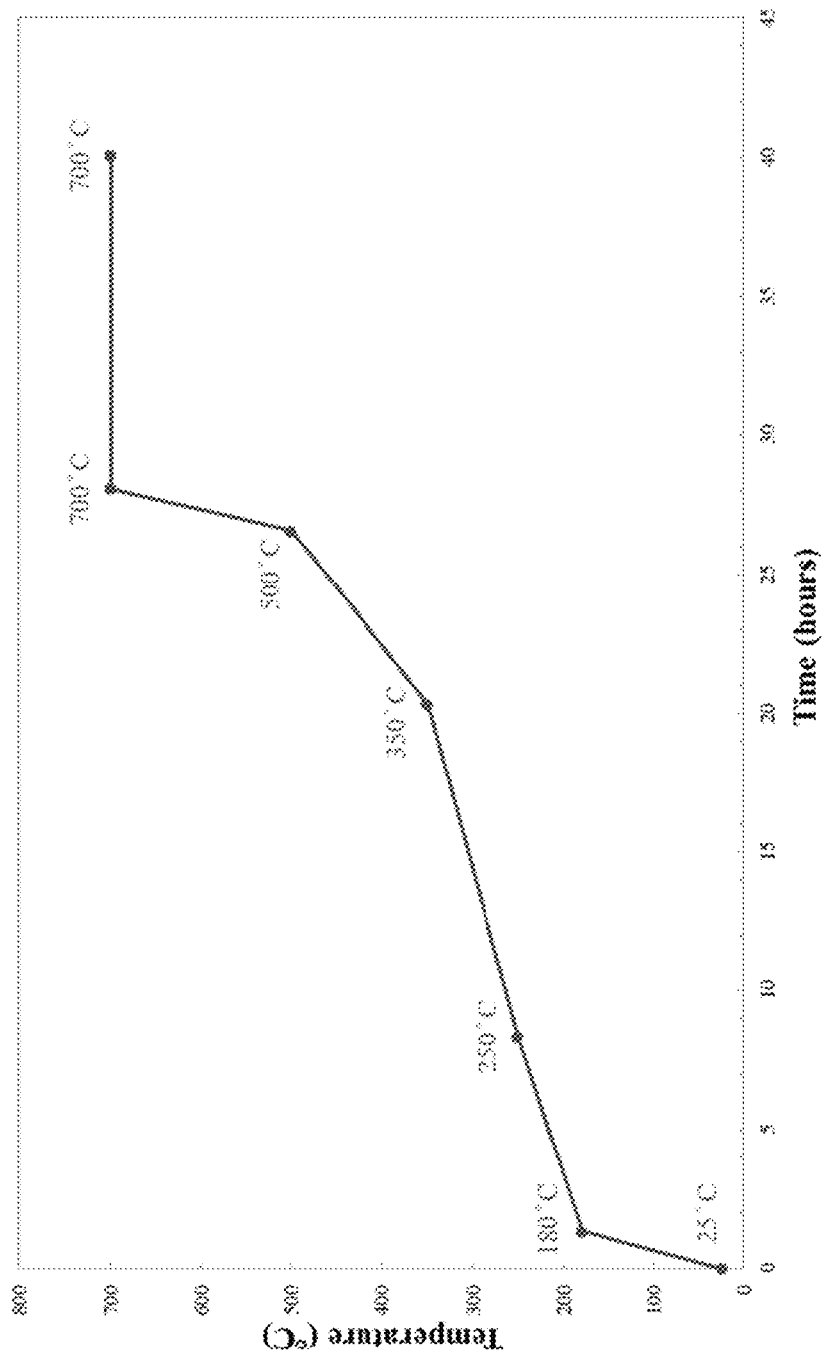
FIG. 4A is a time-temperature curve of a first heat treatment step according to an embodiment of the present disclosure.
Figure 4B:
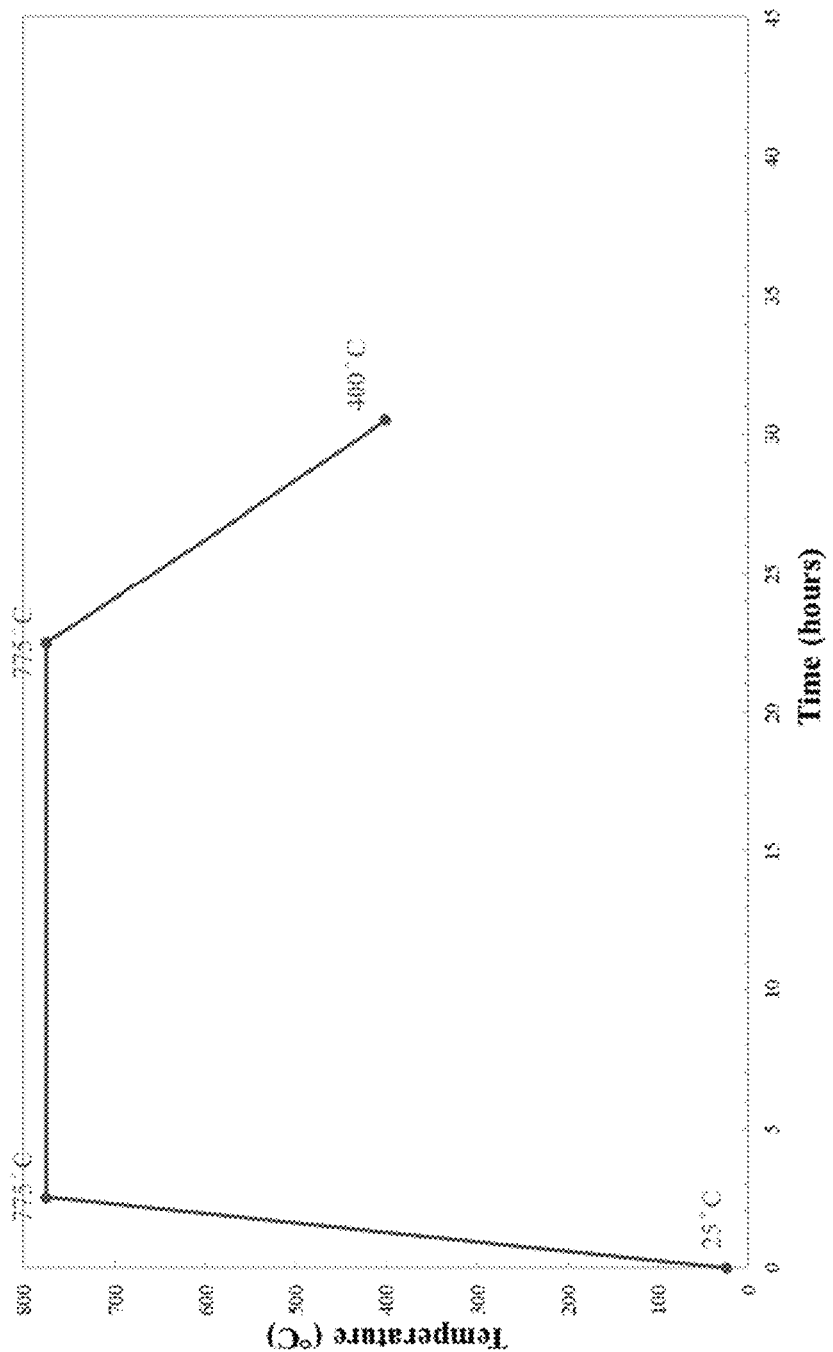
FIG. 4B is a time-temperature curve of a second heat treatment step according to an embodiment of the present disclosure.

Refer to FIGS. 4A to 4B. FIG. 4A is a time-temperature curve of a first heat treatment step according to an embodiment of the present disclosure. FIG. 4B is a time-temperature curve of a second heat treatment step according to an embodiment of the present disclosure. The third solution and the precursor are mixed, and a mixture is formed. The mixture is ground and subjected to a first calcination. Time-temperature curve of the first calcination is shown in FIG. 4A. Firstly, the mixture is heated from room temperature (25° C.), and a heating rate is maintained at 1.94° C./min for 1 hour and 20 minutes to reach 180° C. to remove residual moisture on the surface of the mixture. Secondly, the heating rate is maintained at 0.17° C./min for 7 hours, and the mixture is heated to 250° C. to remove the water of crystallization in the hydrate. Thirdly, the heating rate is maintained at 0.14° C./min for 12 hours, and the mixture is heated to 350° C. to pyrolyze the oxalate and oxidize the mixture. Fourthly, the heating rate is maintained at 0.4° C./min for 6 hours and 15 minutes, and the mixture is heated to 500° C. to melt the lithium hydroxide. Fifthly, the heating rate is maintained at 2.22° C./min for 1 hour and 30 minutes, and the mixture is heated to 700° C. to allow lithium ions to be doped into the crystal lattice. Finally, the mixture is maintained at 700° C. for 12 hours to arrange the crystal lattice into a layered structure. After being subjected to the first calcination, the mixture is taken out, ground, sieved and subjected to a second calcination. Time-temperature curve of the second calcination is shown in FIG. 4B. Firstly, the mixture is heated from room temperature (25° C.), and a heating rate is maintained at 5° C./min for 2 hours and 30 minutes to reach 775° C. Secondly, the mixture is maintained at 775° C. for 20 hours to arrange the crystal lattice into a better layered structure. Finally, the heating rate is maintained at −0.78° C./min for 8 hours to reach 400° C. to reduce the oxygen vacancies in the crystal lattice. The mixture that has been subjected to the second calcination is taken out, ground and sieved, and a particle structure of cathode material 1 with multiple coating layers of different elements is formed. With two-step high-temperature calcination, cation disorder degree of the particle structure of cathode material 1 is reduced, and the orderly layered structure is formed.

Example 2

Preferably but not exclusively, a preparation method of the example 2 is similar to that of the example 1. However, in the preparation method of the example 2, the weight percentage of the potassium alum relative to the precursor is 0.5 wt %.

Example 3

Preferably but not exclusively, a preparation method of the example 3 is similar to that of the example 1. However, in the preparation method of the example 3, the weight percentage of the potassium alum relative to the precursor is 1 wt %.

Comparative Example

Preferably but not exclusively, potassium alum is not added in a preparation method of the comparative example.

Figure 5A:
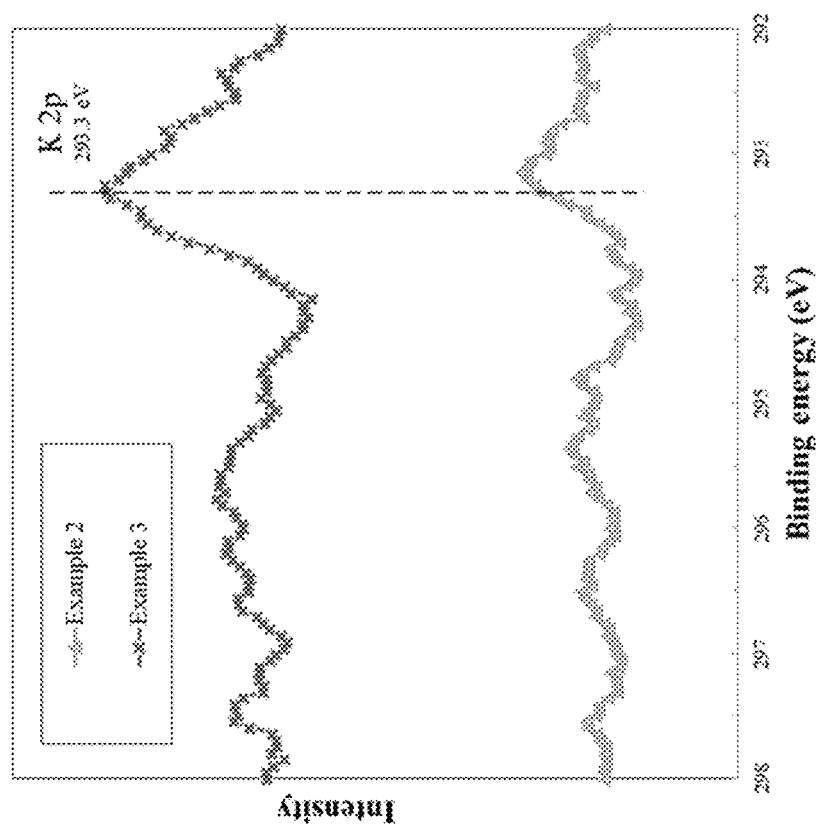
FIGS. 5A to 5C are XPS spectra of an example 2 and an example 3 of the present disclosure.
Figure 5B:
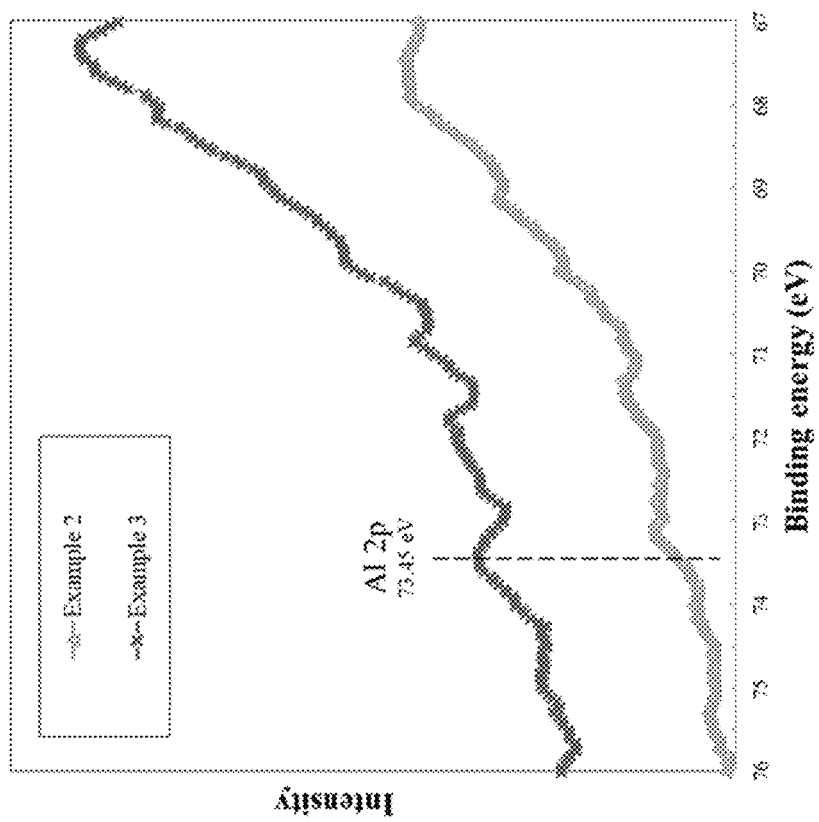
Figure 5C:
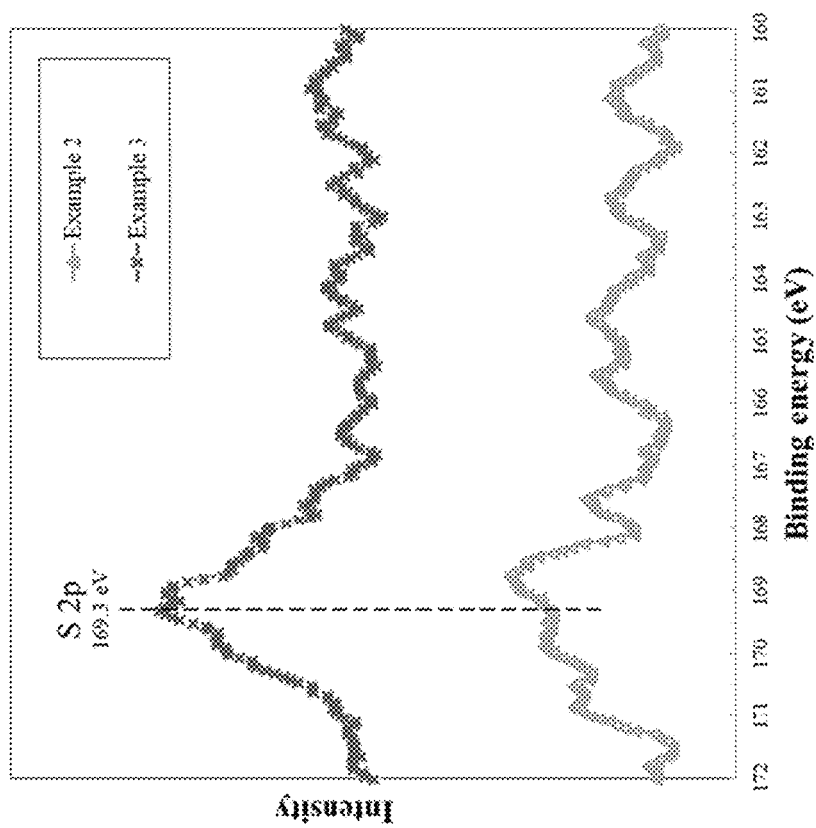

Refer to FIGS. 5A to 5C. FIGS. 5A to 5C are XPS spectra of the example 2 and the example 3 of the present disclosure. FIGS. 5A to 5C are obtained by performing surface analysis on the example 2 and the example 3 with XPS. As shown in FIGS. 5A, 5B and 5C, there are obvious peaks in the binding energy range of potassium, aluminum and sulfur, respectively. It can be seen that potassium, aluminum and sulfur, which are the constituent elements of the potassium alum $(KAl(SO_4)_2 \cdot 12H_2O)$, exist in the particle structure of cathode material 1.

Figure 6A:
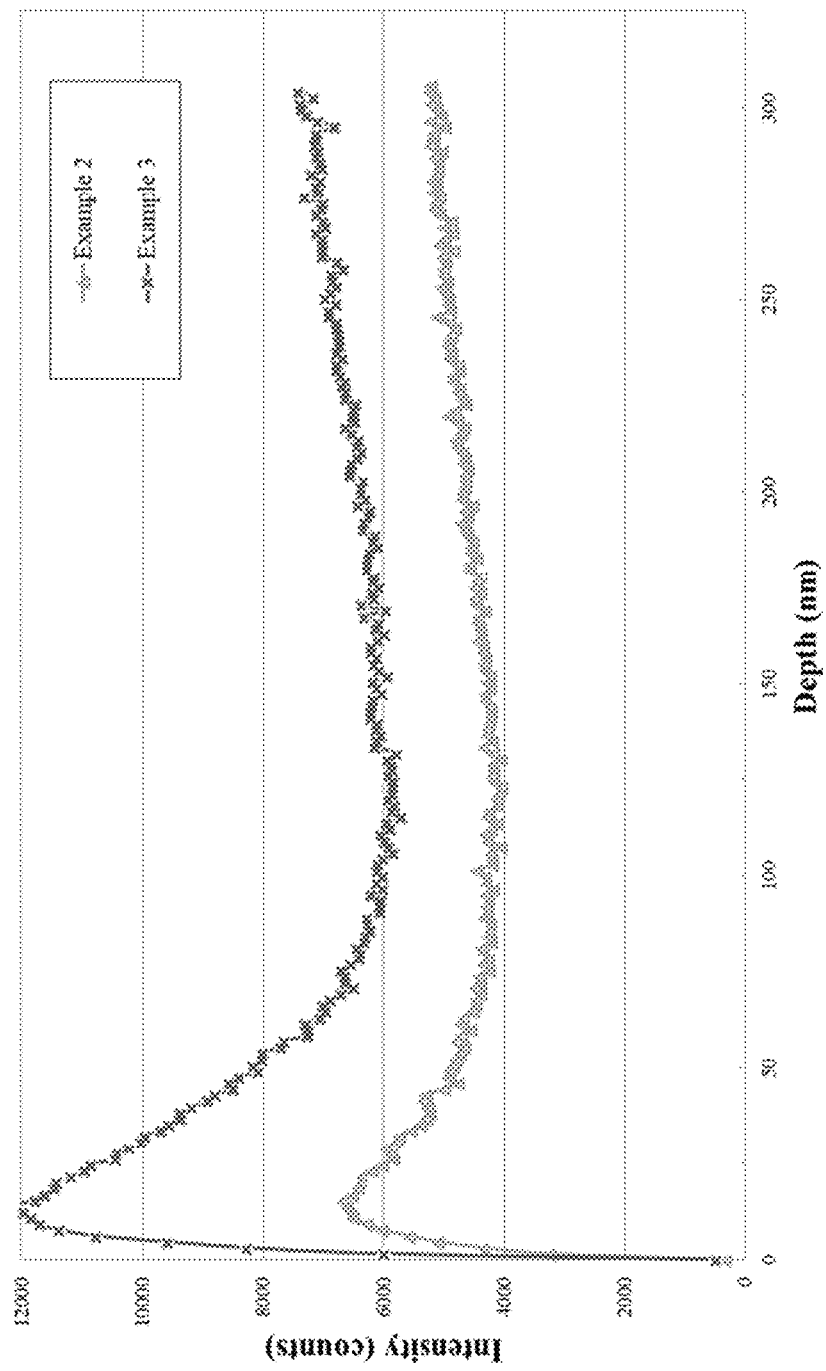
FIG. 6A is a TOF-SIMS depth profile of potassium in the example 2 and the example 3 of the present disclosure.
Figure 6B:
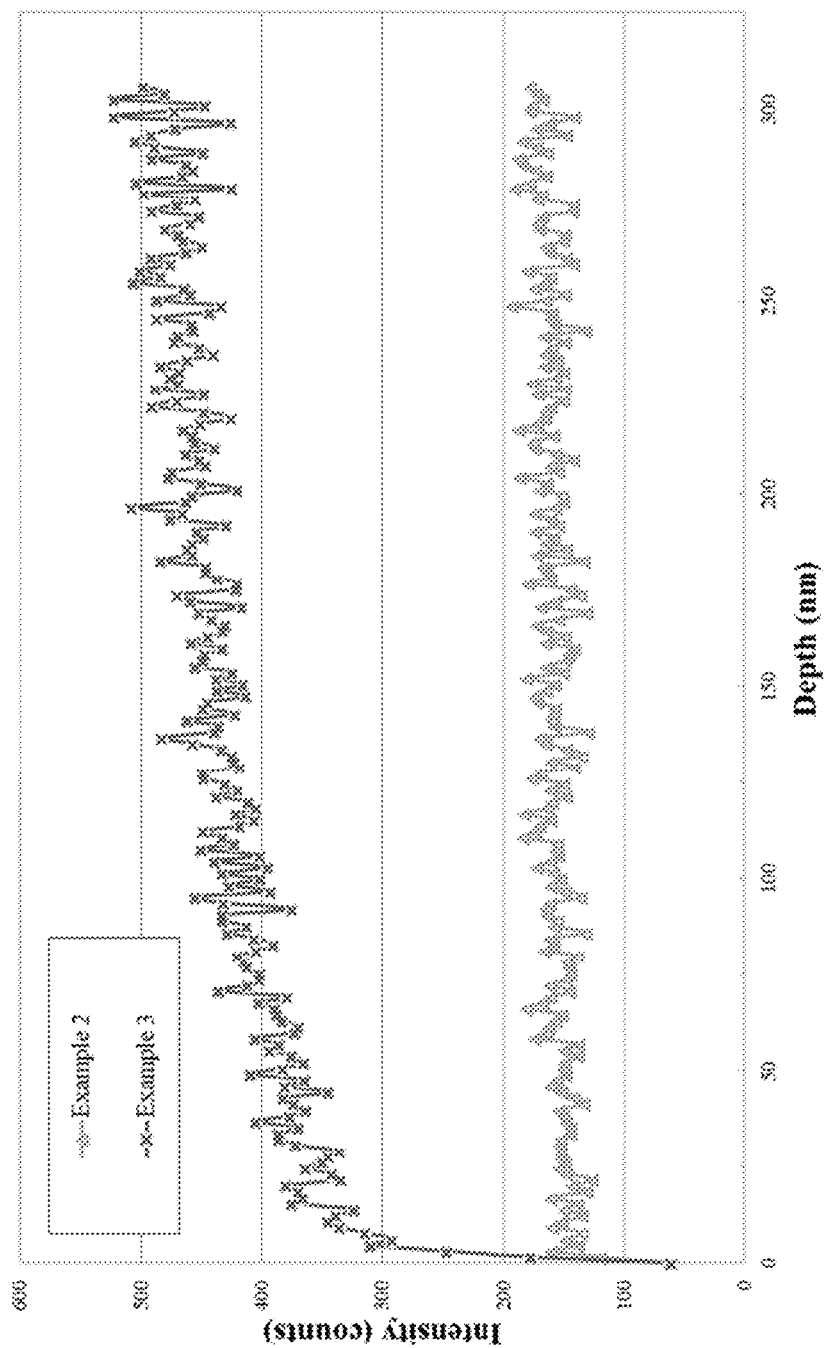
FIG. 6B is a TOF-SIMS depth profile of aluminum in the example 2 and the example 3 of the present disclosure.

Refer to FIGS. 6A and 6B. FIG. 6A is a TOF-SIMS depth profile of potassium in the example 2 and the example 3 of the present disclosure. FIG. 6B is a TOF-SIMS depth profile of aluminum in the example 2 and the example 3 of the present disclosure. FIGS. 6A and 6B are obtained by performing depth profiling analyses on the example 2 and the example 3 with TOF-SIMS. As shown in FIGS. 6A and 6B, there are signals of potassium and aluminum within a sputter depth of 300 nm, respectively. However, there is no obvious signal of sulfur. Combined with the XPS analysis results above, it can be seen that sulfur is present in the surface of the particle structure of cathode material 1 at a depth of about 1 nm to 3 nm, and potassium and aluminum are doped into the particle structure of cathode material 1. As shown in FIG. 6A, the doping concentration of potassium in the particle structure of cathode material 1 near the surface is higher than that in the interior, and the part with the higher doping concentration of potassium has a thickness between 30 nm and 70 nm. As shown in FIG. 6B, the doping concentration of aluminum is approximately the same at different depths of the particle structure of cathode material 1.

Figure 7A:
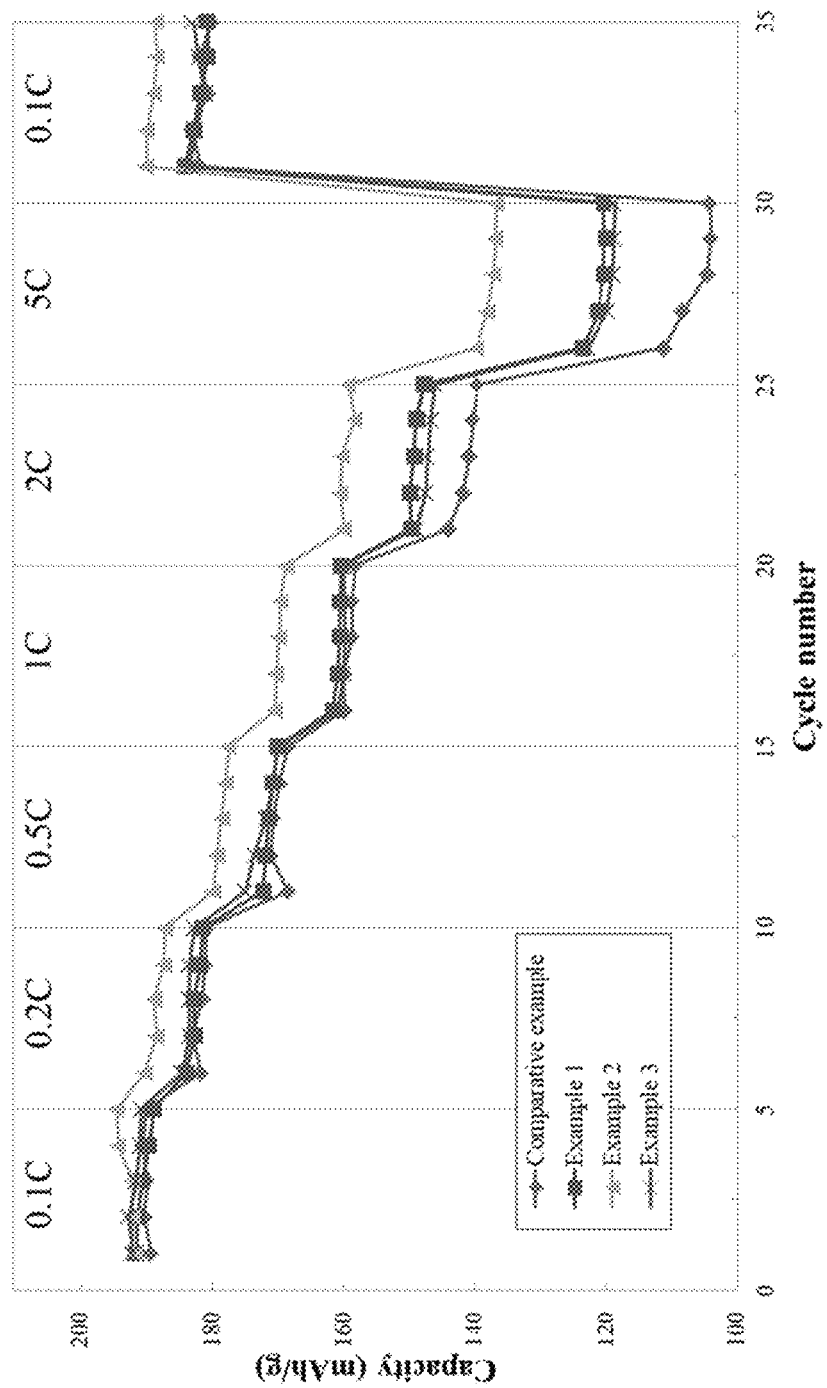
FIGS. 7A and 7B are charge-discharge characteristic diagrams of a comparative example, an example 1, the example 2 and the example 3 at different charge and discharge rates.
Figure 7B:
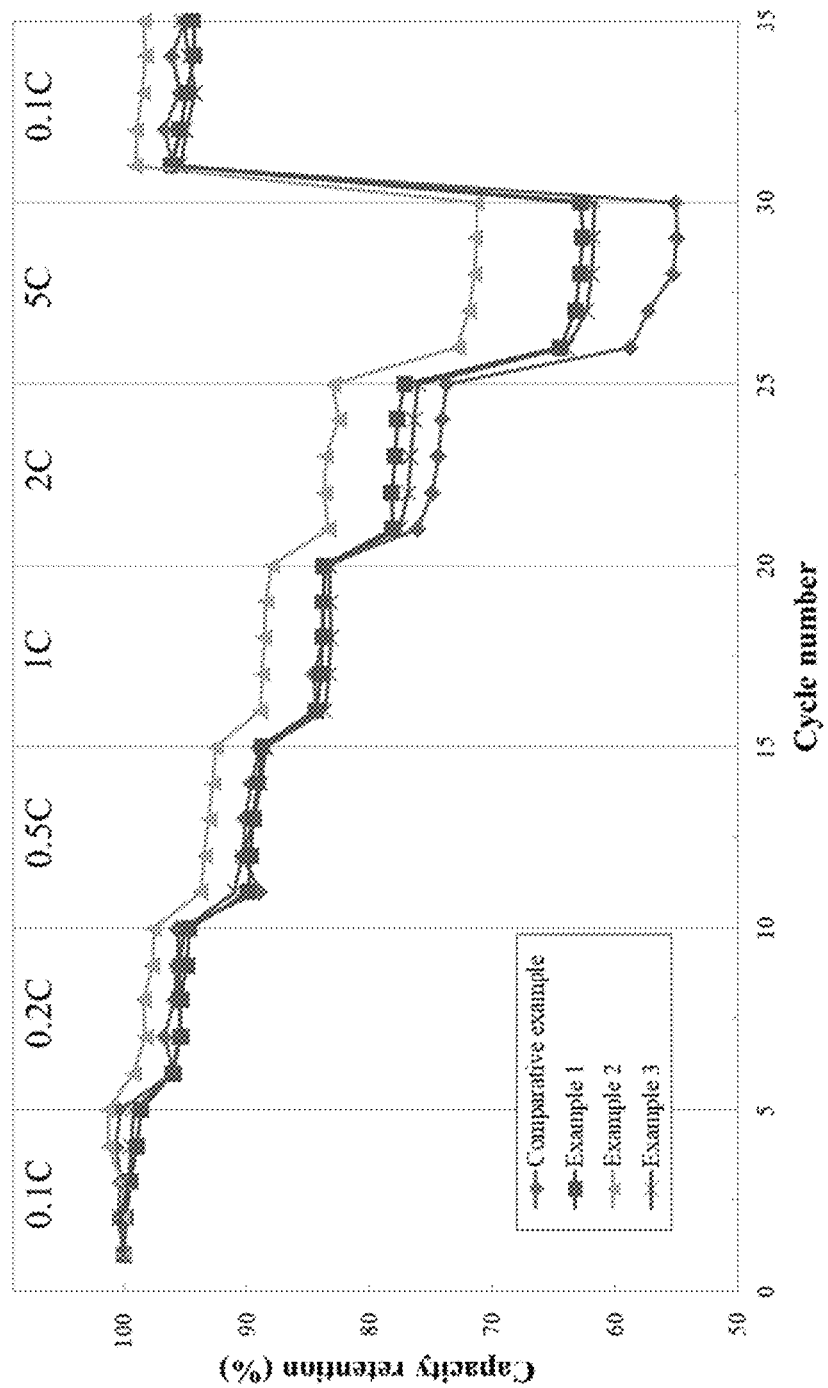

Refer to FIGS. 7A and 7B. FIGS. 7A and 7B are charge-discharge characteristic diagrams obtained by performing a test on the comparative example, the example 1, the example 2 and the example 3 at charge and discharge rates (C-rates) of 0.1C, 0.2C, 0.5C, 1C, 2C, 5C and 0.1C in sequence for 5 cycles, respectively. The test is performed with a button battery formed by the particle structure of cathode material 1. The electrode of the button battery is formed by mixing the particle structure of cathode material 1, a conductive carbon black and a polyvinylidene fluoride (PVDF) in a ratio of 8:1:1. Preferably but not exclusively, the electrolyte includes 1.2 M lithium hexafluorophosphate ($LiPF_6$) solution, ethylene carbonate (EC), dimethyl carbonate (DMC), and 4 wt % fluoroethylene carbonate (FEC). The test temperature is room temperature (25° C.), and the test voltage range is 2.8V to 4.3V. As shown in the diagrams, the capacity and the capacity retention of the example 1, the example 2 and the example 3 are obviously higher than those of the comparative example without addition potassium alum. The example 2 with 0.5 wt % potassium alum has the best performance.

Figure 8A:
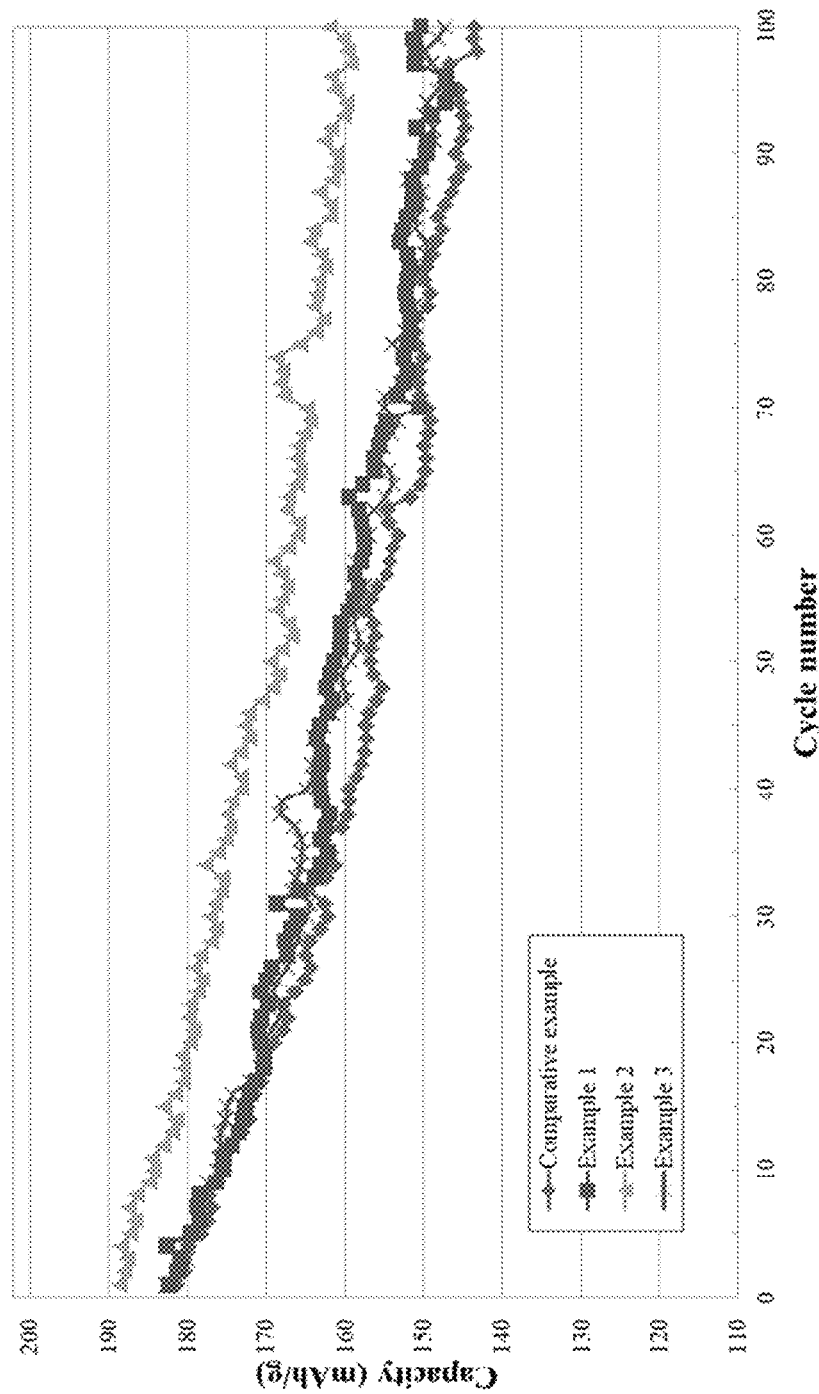
FIGS. 8A and 8B are charge-discharge characteristic diagrams of the comparative example, the example 1, the example 2 and the example 3 under a charge and discharge rate, voltage range and temperature condition.
Figure 8B:
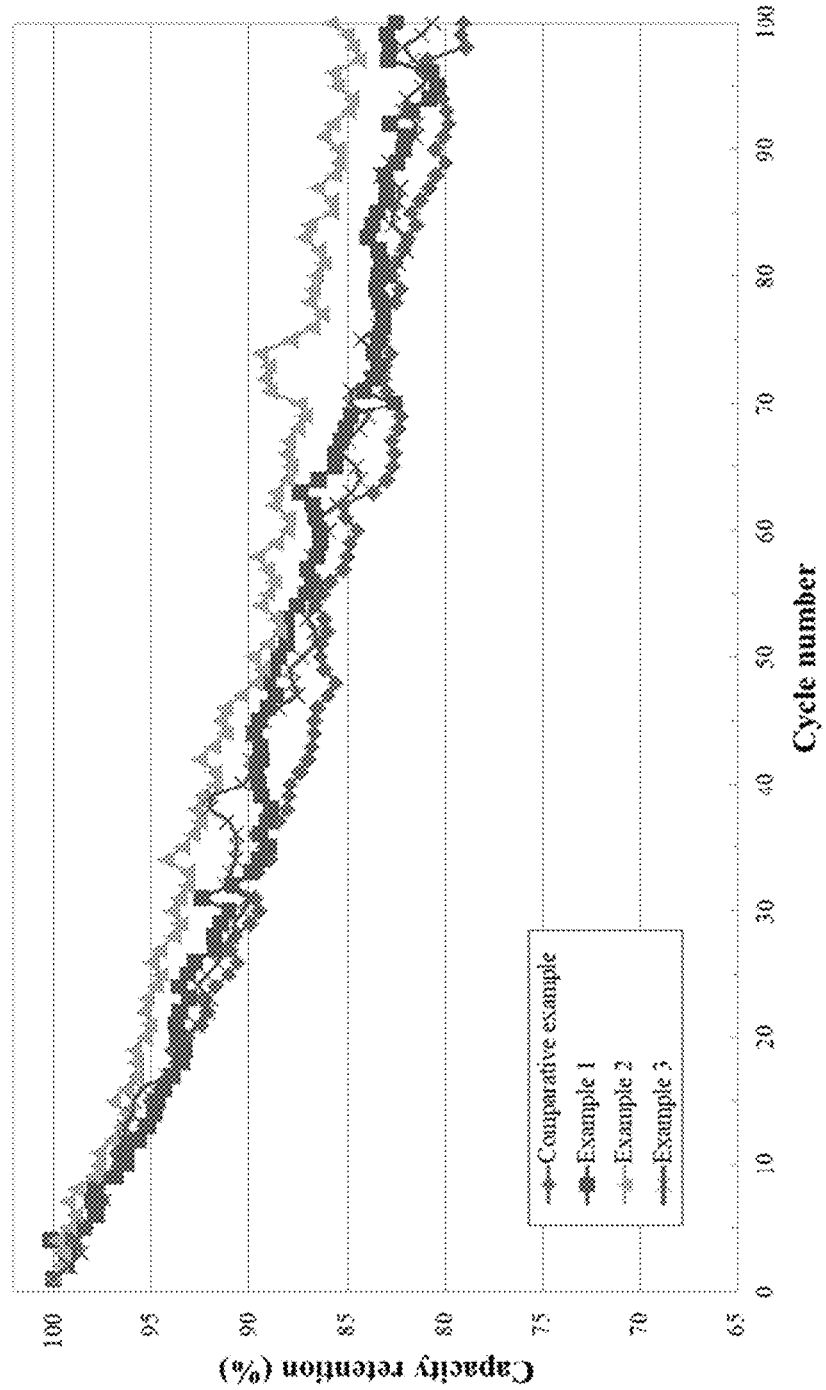

Refer to FIGS. 8A and 8B. FIGS. 8A and 8B are charge-discharge characteristic diagrams obtained by performing a test on the comparative example, the example 1, the example 2 and the example 3 at a C-rate of 0.3C, a voltage range of 2.8V to 4.3V and a room temperature (25° C.). The following table 1 shows the testing results. The test is performed with a button battery made of the particle structure of cathode material 1. The composition of the button battery is the same as above, and is not redundantly described herein. As shown in FIG. 8A, the capacities of the example 1, the example 2 and the example 3 are higher than that of the comparative example at a high cycle number. Especially the example 2 has the best performance. As shown in FIG. 8B, capacity retentions of the example 1, the example 2 and the example 3 are higher than the comparative example at a high cycle number. Especially the example 2 has the best performance. As shown in table 1 below, the capacity of the comparative example after 100 cycles is 143 mAh/g, and the capacity retention is 79%. In contrast, the capacity of the example 2 after 100 cycles is 162 mAh/g, and the capacity retention is 86%. It can be concluded from the above results that the particle structure of cathode material 1 of the present disclosure facilitates the migration of lithium ions with an inner coating layer including potassium and aluminum, and avoid the reaction between the cathode material and the electrolyte with an outer coating layer including sulfur. Accordingly, the purpose of improving cycle life, capacity and stability of battery is achieved.

TABLE 1

|  | Capacity after 1 cycle (mAh/g) | Capacity after 100 cycles (mAh/g) | Capacity retention after 100 cycles |
|---|---|---|---|
| Comparative example | 181 | 143 | 79% |
| Example 1 (0.3 wt % potassium alum) | 182 | 150 | 82% |
| Example 2 (0.5 wt % potassium alum) | 188 | 162 | 86% |
| Example 3 (1 wt % potassium alum) | 183 | 147 | 80% |

Figure 9A:
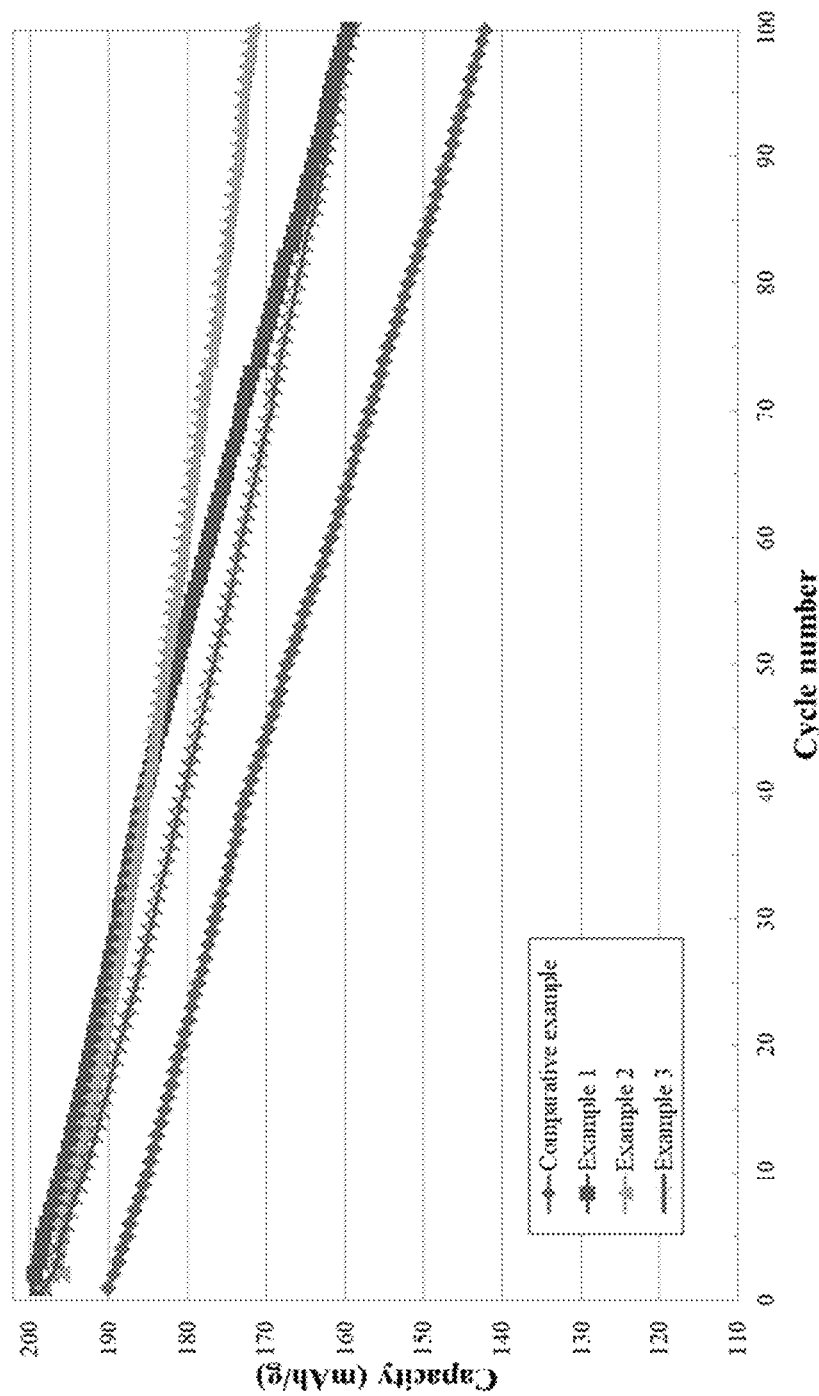

FIGS. 9A and 9B are charge-discharge characteristic diagrams obtained by performing a test on the comparative example, the example 1, the example 2 and the example 3 at a C-rate of 0.5C, a voltage range of 2.8V to 4.3V and a temperature of 55° C. The following table 2 shows the testing results. The test is performed with a button battery made of the particle structure of cathode material 1. The composition of the button battery is the same as above, and is not redundantly described herein. As shown in FIG. 9A, the capacities of the example 1, the example 2 and the example 3 are similar, but all of them are obviously higher than the capacity of the comparative example at a low cycle number. Especially the example 2 has the best performance at a higher cycle number. It is noted that the capacities of the example 1, the example 2 and the example 3 are higher than that of the comparative example at different cycle numbers. As shown in FIG. 9B, capacity retentions of the example 1, the example 2 and the example 3 are higher than the comparative example at a high cycle number. Especially the example 2 has the best performance. As shown in table 2 below, the capacity of the comparative example after 100 cycles is 142 mAh/g, and the capacity retention is 75%. In contrast, the capacity of the example 2 after 100 cycles is 172 mAh/g, and the capacity retention is 87%. It can be concluded from the above results that the particle structure of cathode material 1 of the present disclosure facilitates the migration of lithium ions with an inner coating layer including potassium and aluminum, and avoid the reaction between the cathode material and the electrolyte with an outer coating layer including sulfur. Accordingly, the purpose of improving cycle life, capacity and stability of battery is achieved.

TABLE 2

| | Capacity after 1 cycle (mAh/g) | Capacity after 100 cycles (mAh/g) | Capacity retention after 100 cycles |
|---|---|---|---|
| Comparative example | 190 | 142 | 75% |
| Example 1 (0.3 wt % potassium alum) | 199 | 160 | 80% |
| Example 2 (0.5 wt % potassium alum) | 198 | 172 | 87% |
| Example 3 (1 wt % potassium alum) | 198 | 159 | 80% |

Figure 10A:
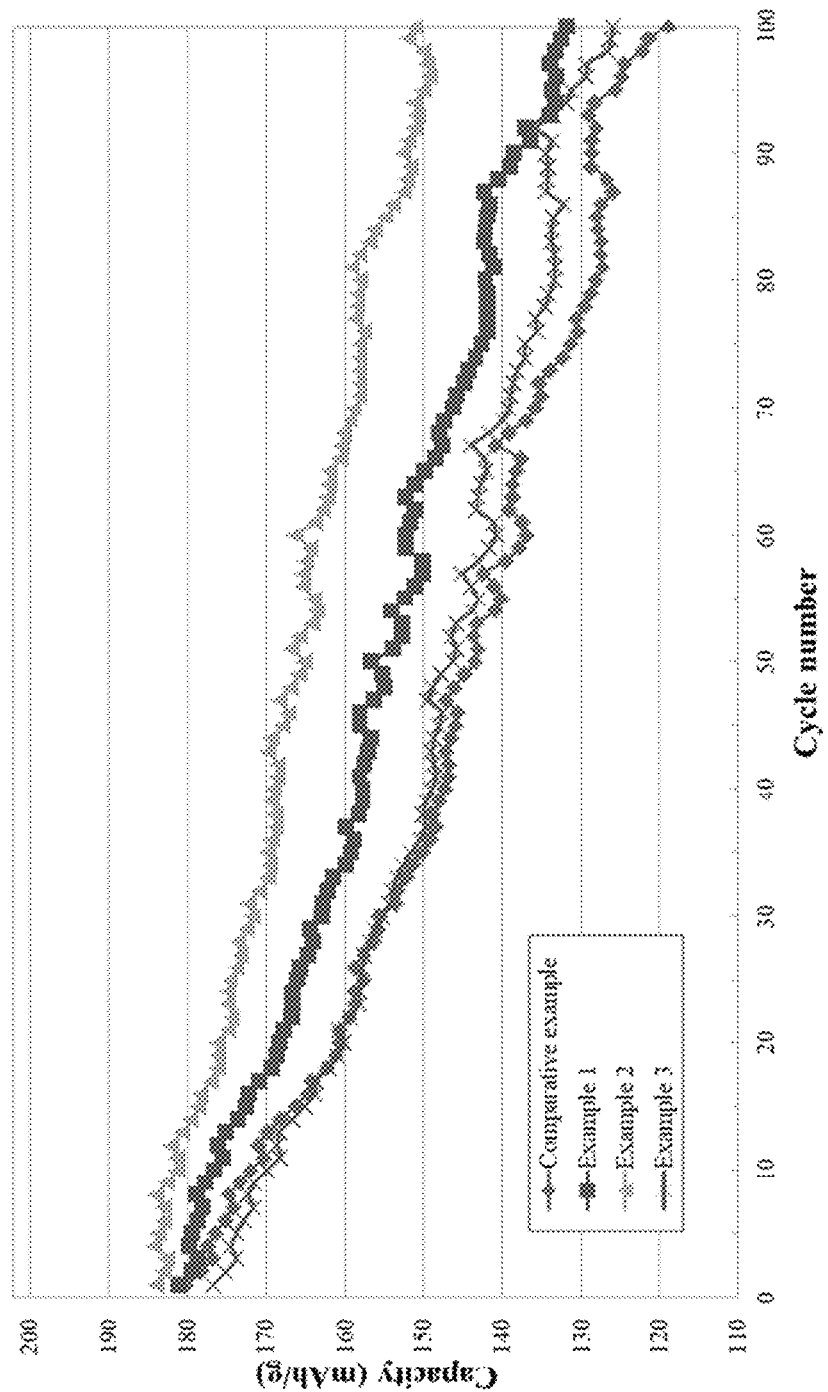
FIGS. 10A and 10B are charge-discharge characteristic diagrams of the comparative example, the example 1, the example 2 and the example 3 under another charge and discharge rate, voltage range and temperature condition.
Figure 10B:
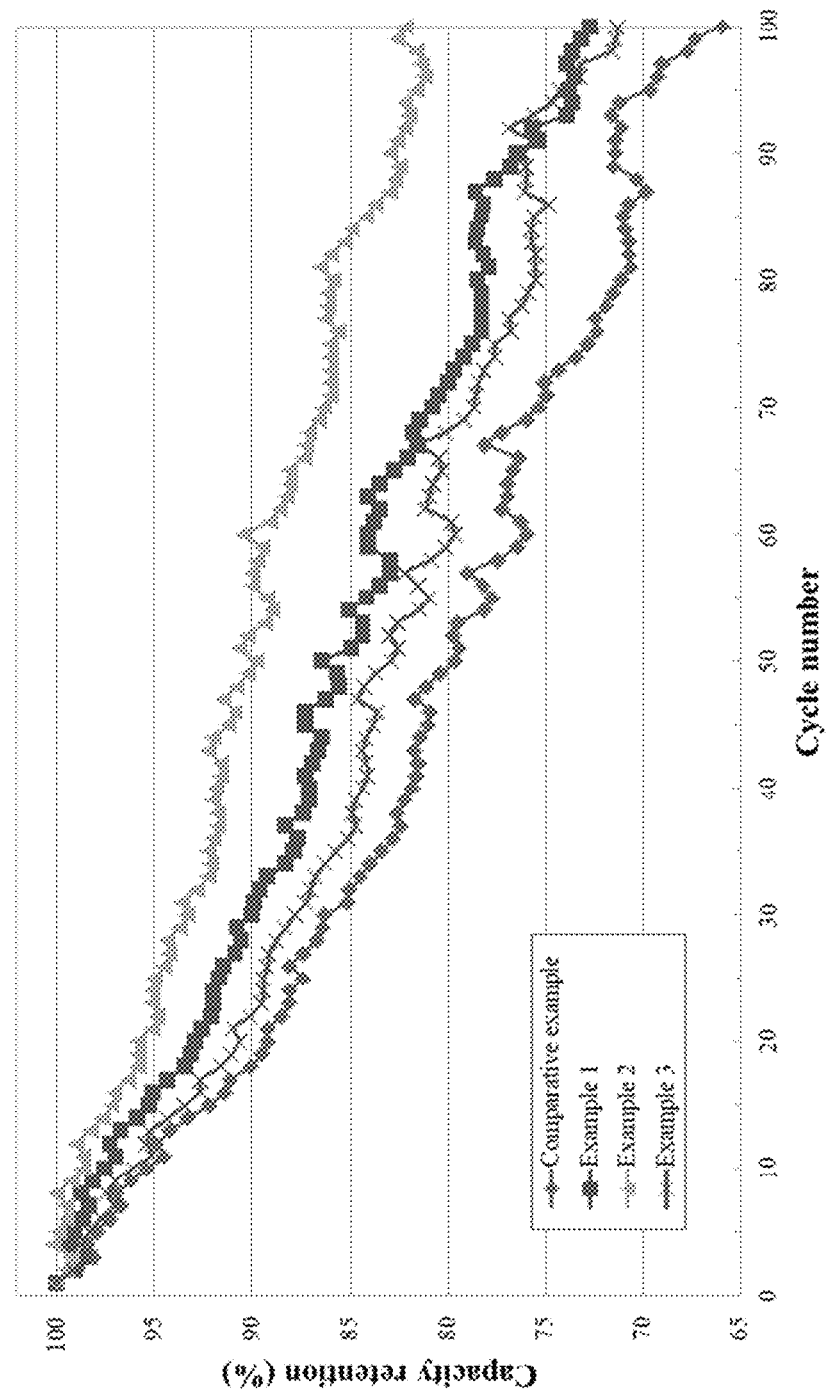

FIGS. 10A and 10B are charge-discharge characteristic diagrams obtained by performing a test on the comparative example, the example 1, the example 2 and the example 3 at a C-rate of 0.3C, a voltage range of 2.8V to 4.5V and a room temperature (25° C.). The following table 3 shows the testing results. The test is performed with a button battery made of the particle structure of cathode material 1. The composition of the button battery is the same as above, and is not redundantly described herein. As shown in FIG. 10A, the capacities of the example 1, the example 2 and the example 3 are higher than that of the comparative example at a high cycle number. Especially the example 2 has the best performance. As shown in FIG. 10B, capacity retentions of the example 1, the example 2 and the example 3 are obviously higher than the comparative example at a high cycle number. Especially the example 2 has the best performance.

As shown in table 3 below, the capacity of the comparative example after 100 cycles is 119 mAh/g, and the capacity retention is 66%. In contrast, the capacity of the example 2 after 100 cycles is 151 mAh/g, and the capacity retention is 82%. It can be concluded from the above results that the particle structure of cathode material 1 of the present disclosure facilitates the migration of lithium ions with an inner coating layer including potassium and aluminum, and avoid the reaction between the cathode material and the electrolyte with an outer coating layer including sulfur. Accordingly, the purpose of improving cycle life, capacity and stability of battery is achieved.

TABLE 3

| | Capacity after 1 cycle (mAh/g) | Capacity after 100 cycles (mAh/g) | Capacity retention after 100 cycles |
|---|---|---|---|
| Comparative example | 180 | 119 | 66% |
| Example 1 (0.3 wt % potassium alum) | 181 | 132 | 73% |
| Example 2 (0.5 wt % potassium alum) | 184 | 151 | 82% |
| Example 3 (1 wt % potassium alum) | 177 | 126 | 71% |

As stated above, a particle structure of cathode material and a preparation method thereof for improving a working voltage and a cycle life of a battery formed thereby is provided in the present disclosure. The particle structure of cathode material includes at least two coating layers, and each of the different coating layers has different element composition. Preferably but not exclusively, the at least two coating layers are a first coating layer as an inner coating layer and a second coating layer as an outer coating layer. Since the first coating layer contains potassium and aluminum, it is conducive to the migration of lithium ions. Moreover, the second coating layer contains sulfur, so that the reaction between the cathode material and the electrolyte during charging and discharging is avoided. Accordingly, the purpose of improving battery performances, such as cycle life, capacity and stability, is achieved. Preferably but not exclusively, a metal salt and a lithium ion compound are mixed and added to a precursor, and a mixture is formed. The metal salt includes potassium, aluminum and sulfur. The precursor includes nickel, cobalt and manganese. After that, the mixture is subjected to a heat treatment, and the particle structure of cathode material is formed. The particle structure of cathode material has at least two coating layers. Thicknesses and compositions of the at least two coating layers are obtained through analysis results of an X-ray photoelectron spectroscopy (XPS) and a time-of-flight secondary ion mass spectrometer (TOF-SIMS). With at least two coating layers having different compositions, such as potassium, aluminum and sulfur, respectively, the migration of lithium ions is improved, and the reaction between the cathode material and the electrolyte during charging and discharging is avoided. Preferably but not exclusively, a potassium alum in a specific ratio range is added into a precursor, and a mixture is formed. The mixture is subjected to two heat treatment steps, and the particle structure of cathode material is formed to have at least two coating layers. The particle structure of cathode material has low cation disorder degree and orderly layered structure Moreover, the preparation method of the particle structure of cathode material is simple and low costing. It is helpful of enhancing the product competitiveness of the battery formed by the particle structure of cathode material.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A preparation method of a particle structure of cathode material, comprising steps of:
   (a) providing a precursor configured to form a core, wherein the precursor comprises at least nickel, cobalt and manganese;
   (b) providing a metal salt and a lithium ion compound, wherein the metal salt comprises at least potassium, aluminum and sulfur;
   (c) mixing the metal salt, the lithium ion compound and the precursor to form a mixture; and
   (d) subjecting the mixture to a heat treatment step to form the particle structure of cathode material, wherein the particle structure of cathode material comprises the core, a first coating layer and a second coating layer, wherein the core comprises potassium, aluminum and a Li-M-O based material, wherein M is one selected from the group consisting of nickel, cobalt, manganese, magnesium, titanium, aluminum, tin, chromium, vanadium, molybdenum and a combination thereof, wherein the first coating layer is coated on the core, and the second coating layer is coated on the first coating layer, wherein the first coating layer comprises potassium and aluminum, and a potassium content of the first coating layer is higher than a potassium content of the core, wherein the second coating layer comprises sulfur.

2. The preparation method according to claim 1, wherein the Li-M-O based material is a lithium nickel manganese cobalt oxide.

3. The preparation method according to claim 1, wherein the particle structure of cathode material has a particle size ranged from 3 μm to 10 μm.

4. The preparation method according to claim 1, wherein the particle structure of cathode material has a potassium content ranged from 0.01 mol % to 0.2 mol %, wherein the particle structure of cathode material has an aluminum content ranged from 0.01 mol % to 0.2 mol %.

5. The preparation method according to claim 1, wherein the first coating layer has a first thickness, and the second coating layer has a second thickness, wherein the first thickness is greater than the second thickness.

6. The preparation method according to claim 5, wherein the first thickness is ranged from 12 nm to 70 nm, and the second thickness is ranged from 1 nm to 3 nm, wherein the first thickness and the second thickness are obtained through analysis results of an X-ray photoelectron spectroscopy and a time-of-flight secondary ion mass spectrometer.

7. The preparation method according to claim 1, wherein the precursor is formed by a co-precipitation of a first solution and a second solution, wherein the first solution comprises at least nickel, cobalt and manganese, and the second solution comprises at least oxalic acid.

8. The preparation method according to claim 1, wherein the step (b) further comprises a step:
   (b1) dissolving the metal salt and the lithium ion compound in a water to form a third solution.

9. The preparation method according to claim 1, wherein the metal salt has a weight percentage relative to the precursor, and the weight percentage is ranged from 0.1 wt % to 2 wt %.

10. The preparation method according to claim 1, wherein the heat treatment step comprises a temperature-holding step, and the temperature-holding step has a temperature greater than or equal to 700° C.

11. The preparation method according to claim 1, wherein the heat treatment step further comprises a first heat treatment step and a second heat treatment step, wherein a maximum temperature of the second heat treatment step is greater than a maximum temperature of the first heat treatment step.

12. The preparation method according to claim 1, wherein the metal salt is a potassium alum.

13. A particle structure of cathode material, comprising:
   a core comprising potassium, aluminum and a Li-M-O based material, wherein M is one selected from the group consisting of nickel, cobalt, manganese, magnesium, titanium, aluminum, tin, chromium, vanadium, molybdenum and a combination thereof;
   a first coating layer coated on the core, wherein the first coating layer comprises potassium and aluminum, and a potassium content of the first coating layer is higher than a potassium content of the core; and
   a second coating layer coated on the first coating layer, wherein the second coating layer comprises sulfur.

14. The particle structure of cathode material according to claim 13, wherein the Li-M-O based material is a lithium nickel manganese cobalt oxide.

15. The particle structure of cathode material according to claim 13, wherein the particle structure of cathode material has a particle size ranged from 3 μm to 10 μm.

16. The particle structure of cathode material according to claim 13, wherein the particle structure of cathode material has a potassium content ranged from 0.01 mol % to 0.2 mol %, wherein the particle structure of cathode material has an aluminum content ranged from 0.01 mol % to 0.2 mol %.

17. The particle structure of cathode material according to claim 13, wherein the first coating layer has a first thickness, and the second coating layer has a second thickness, wherein the first thickness is greater than the second thickness.

18. The particle structure of cathode material according to claim 17, wherein the first thickness is ranged from 12 nm to 70 nm, and the second thickness is ranged from 1 nm to 3 nm, wherein the first thickness and the second thickness are obtained through analysis results of an X-ray photoelectron spectroscopy and a time-of-flight secondary ion mass spectrometer.

* * * * *